Nov. 13, 1945.     C. M. HINES     2,389,050
ELECTRONIC BRAKE CONTROL SYSTEM
Filed April 28, 1944
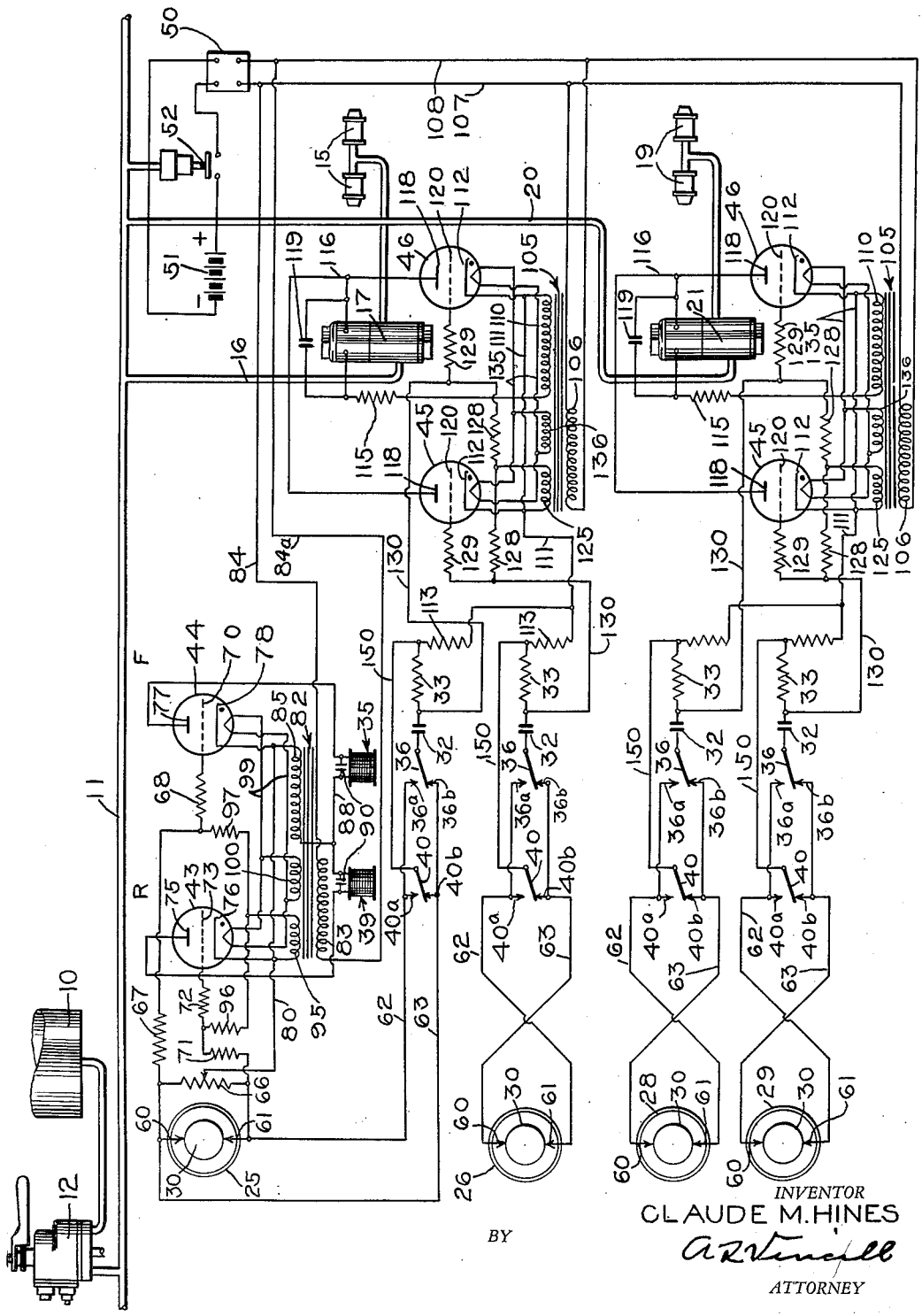
INVENTOR
CLAUDE M. HINES
BY
ATTORNEY Patented Nov. 13, 1945

2,389,050

UNITED STATES PATENT OFFICE 2,389,050

ELECTRONIC BRAKE CONTROL SYSTEM

Claude M. Hines, Pittsburgh, Pa., assignor to The Westinghouse Air Brake Company, Wilmerding, Pa., a corporation of Pennsylvania Application April 28, 1944, Serial No. 533,117

17 Claims. (Cl. 303—21)

This invention relates to means for detecting and regulating changes in speed or deceleration and acceleration of a rotary element, such as a vehicle wheel, and more particularly to electrical means responsive to the rate of change of speed of a vehicle wheel for controlling application of the associated brakes in a manner preventing sliding of the wheels.

In order to facilitate maintenance of crowded schedules for railroad traffic within modern standards, it has become necessary to devote increased attention to the braking of the trains operated in high speed service. As is generally understood, a train equipped with air brakes subject to control of properly designed anti-wheelslide apparatus can safely be operated at higher speeds than a train lacking such equipment. A braked wheel may begin to slip on the rail when retarded with excessive force, after which the loss of adhesion between the wheel and rail is likely to cause further deceleration of the wheel at an abnormally rapid rate until it becomes locked and slides, resulting not only in damage to the wheel, but also in extension of the time required to bring the vehicle to a stop.

Although the desirability of providing railroad trains with such automatically controlled brake equipment has been recognized, the first cost and expense of maintenance of the extra elements involved in a brake system having antiwheel-slide control may constitute a detergent to general adoption thereof by many railroads. The typical brake controlling equipment of the axle-driven generator type heretofore employed has necessarily required the provision of a considerable number of electrical relay devices, which involve expensive features of construction, inasmuch as each relay must be so constructed as to operate on low power and must possess maximum stability with respect to its operating characteristics. In addition, each axle-driven generator heretofore provided for measuring the rate of deceleration and for furnishing power to operate an anti-wheel-slide control system has necessarily been of relative large size to insure sufficient capacity to operate the considerable number of the electroresponsive relay elements included in the system. Such a generator represents a considerable item in the total cost of the equipment. While certain of the anti-wheel-slip systems already in use have afforded vast improvement in train braking performance in the service to which the improved equipment could be economically furnished, it is thus apparent that even greater and more widespread advantages would accrue if such equipments were devised for construction and operation at a reduced cost rendering feasible the use of the improvements as standard equipment.

Practical consideration of the problems involved in construction and operation of this type of brake control apparatus has indicated that a significant advance in that field can best be obtained with an entirely new control system operating on a different principle than that of the earlier equipments. This result I propose to achieve by employment of a novel and relatively inexpensive arrangement combining a wheel driven generator for establishing an electrical characteristic measuring the rotative condition, such as speed or acceleration, of the wheel, and electronic means constructed and arranged to respond to the electrical characteristics exhibited by the generator for governing the brakes to correct undesired slippage of the wheel, the system being designed to operate on low power that can be furnished by a small and simply constructed generator device.

It is accordingly one object of my invention to provide an improved control apparatus embodying electronic means operative to prevent sliding of vehicle wheels, and exhibiting the economic advantages and desirable features of construction just mentioned.

Another object of the invention is to provide an improved brake control apparatus of the axle driven generator type having electronic elements constructed and arranged to insure precise control of the brakes over a wider range of speeds of the vehicle than has heretofore been practicable.

It is still another object of my invention to provide an improved brake control apparatus comprising electronic means for preventing sliding of a vehicle wheel under the control of wheelslip detector means, including axle-driven generator means and electronic directional detector means cooperative therewith.

A further object of the invention is to provide an improved electronic brake control system employing elements operated by alternating current.

Other objects and advantages of the invention will appear in the following more detailed description thereof, taken in connection with the accompanying drawing, in which the single figure is a diagrammatic view of an elementary form of fluid pressure brake apparatus having associated therewith an electronic brake control system constructed in accordance with the invention.

Illustrated in the drawing is an elementary form of fluid pressure brake equipment comprising a source of supply of fluid under pressure including a reservoir 10, a straight air pipe 11, a self-lapping brake valve device 12 operable to control the supply of fluid under pressure to the straight air pipe in effecting an application of the brakes, a pair of brake cylinders 15 for one truck adapted to be supplied with fluid under pressure from the pipe 11 by way of a branch pipe 16 under control of an electroresponsive control valve device 17, and a pair of brake cylinders 19 for the other truck similarly connected to the straight air pipe 11 through the medium of a branch pipe 20 and an electroresponsive control valve device 21.

The self-lapping brake valve device 12 may be of any suitable construction and is automatically operative to maintain the pressure of fluid supplied to the straight air pipe 11 at a value determined by the position to which the usual brake valve handle is moved. Only the essential elements of the fluid pressure brake system are shown schematically in the drawing, but it will be understood that the brake cylinders 15 are operative to apply braking force to wheel units 25 and 26 of the vehicle through the medium of suitable leverage and brake shoe elements, not shown. The brake cylinders 15 are actuated by the pressure of fluid supplied thereto through the medium of the straight air pipe 11, subject, however, to the operation of the electroresponsive control valve device 17 for preventing sliding of the wheels 25 and 26, as hereinafter explained. Similarly, the brake cylinders 19 are associated with vehicle wheel units 28 and 29, and are operative to apply braking force thereto in accordance with the pressure of fluid supplied to the straight air pipe 11, so long as the electroresponsive control valve device 21 is not rendered operative to effect release of the brakes.

The operating elements of the electroresponsive control valve devices 17 and 21 are not shown in detail, but it will be understood that each of these devices comprises spring-pressed valve means normally held in a position for maintaining communication from the straight air pipe 11 through the local branch pipe to the associated brake cylinders, and electromagnet means operative when energized to shift the valve means to another position wherein the valve means closes the supply communication and vents the brake cylinders to the atmosphere.

While the control valves 17 and 21 are illustrated as magnet valves only, it will be understood that they represent any suitable type of control valve device heretofore known which may be employed in their stead, as for example that shown in the copending application, Serial No. 467,236, of Joseph C. McCune and George K. Newell, filed November 28, 1942, and assigned to the assignee of the present application. The control valve device described in the copending application just mentioned functions to control the supply of fluid under pressure to the brake cylinder and the release therefrom in substantially the same manner that the control valves 17 and 21 function except that it functions automatically to restrict the rate at which fluid under pressure is resupplied to the brake cylinder when its magnet winding is deenergized following initial energization thereof. It is desirable to provide a restricted rate of resupply of fluid under pressure to the brake cylinders for a reason hereinafter explained.

Associated with each of the vehicle wheel units 25, 26, 28 and 29 is a wheel-slip detecting apparatus comprising in each case a generator 30 of the direct-current type, which may be suitably mounted in the journal box of the associated wheel unit and is adapted to be driven by the axle to charge a condenser 32 through a resistor 33 to a voltage that is proportional to the speed of the wheel unit. Wheel-slip detector means embodying the general principle of the apparatus just referred to is disclosed in greater detail in my United States Patent No. 2,208,738, issued July 23, 1940, and assigned to the assignee of the present application. According to the present invention, however, electronic direction responsive means is associated with each of the wheel-slip detector systems associated with the several wheels of the vehicle comprising a directional relay device 35 controlling four movable contact elements 36, a similar directional relay device 39 controlling four contact elements 40, and a pair of electron discharge devices 43 and 44, which are arranged to effect selective energization of the directional relays in accordance with the direction in which the vehicle is operated, as hereinafter explained.

As will be more readily apparent from the detailed description of the operation of the equipment hereinafter presented, the purpose served by the directional relays 39 and 35, under control of the respective electron discharge devices 43 and 44, is to control the positioning of the respective sets of contact elements 40 and 36, to the end that each condenser 32 will discharge current in the same direction through the series-connected resistor 33, upon decline in the voltage output of the associated generator 30 during deceleration of the related vehicle wheel unit, regardless of the direction in which the vehicle may be moving. Thus the polarity at the terminals of each resistor 33 will always remain the same during discharge of current therethrough from the associated condenser 32, while the voltage drop across the resistor will at the same be a measure of the rate of deceleration of the wheel unit in control of that circuit.

The equipment shown in the drawing further comprises electronic control means constructed and arranged for cooperation with the wheel-slip detecting apparatus associated with each of the wheel units of the vehicle to control operation of the corresponding electroresponsive brake control valve device 17 or 21 to prevent sliding of a wheel during an application of the brakes. The electronic control means for the wheel units 25 and 26 includes a pair of electron discharge devices 45 and 46 which are connected, as hereinafter more fully described, to control energization of the magnet of the control valve device 17 in accordance with the voltage drop produced in the associated resistors 33. Another pair of electron discharge devices, exactly similar to those just described and identified by the same reference characters 45 and 46, are provided for controlling energization of the brake control valve device 21, in accordance with operation of the respective wheel-slip detecting means associated with the wheel units 28 and 29.

Alternating current for energizing the various circuits controlled by the electron discharge devices just identified may be supplied through the medium of an inverter device 50 of any suitable construction, which is arranged to convert to alternating current the energy received from a suitable source such as a battery 51, upon closure of a pneumatic switch 52 by the pressure of fluid supplied to the straight air pipe 11 in effecting an application of the brakes.

To examine in greater detail the elements of the wheel-slip detector apparatus energized from the generators 30 driven by the wheel units of the vehicle, it will be seen that each generator has an upper terminal 60 and a lower terminal 61, the latter being in each case connected to a conductor 62 leading to upper contact elements 40a and 36a of the directional relays, and each terminal 60 being connected to a conductor 63 leading to lower contact elements 40b and 36b of the relays.

For controlling operation of the two directional relays, the generator 30 driven by the uppermost wheel unit 25, as viewed in the drawing, has connected across its terminals 60 and 61, a resistor 66, one end of which is connected through the medium of a resistance 67 and a current limiting resistance 68 to a control member or grid 70 of the electron discharge device 44. The opposite end of the resistor 66 is similarly connected by means of a resistance 71 and a current limiting resistance 72 to a control member 73 of the electron discharge device 43. The electron discharge devices 43 and 44 are provided respectively with anodes 75 and 77, and with cathodes 76 and 78, the cathodes of both devices being connected by means of a conductor 80 to a midpoint connection of the resistor 66.

Power is supplied for energizing the circuits controlled by the electron discharge devices 43 and 44 by means of a suitable transformer 82 having a primary winding 83, which is connected through the medium of conductors 84 and 84a to the output terminals of the inverter device 50. The transformer 82 has a secondary winding 85 which is connected in the cathode-anode circuits of the respective electron discharge devices, the right-hand end of the winding, as viewed in the drawing, being connected to the cathodes 76 and 78, and the left-hand end of the winding being connected to a conductor 88 having one branch connecting the coil of relay 39 in series with the anode 75, and having another branch connecting the winding of the relay 35 in series with anode 77 of the electron discharge device 44. It will be observed that a filtering condenser 90 is connected across each of coils of the directional relays 39 and 35, for the purpose of smoothing out the pulsating current supplied to the coils, as hereinafter explained.

As a means of providing a biasing voltage for the control members of the electron discharge devices 43 and 44, the transformer 82 is provided with another secondary winding 95, the left-hand end of which is connected to the conductor 80 and consequently to the cathodes 76 and 78 of the two tubes. The right-hand end of the secondary winding 95, as viewed in the drawing, is connected through a resistance 96 and the current limiting resistance 72 to the control member 73, and also through a resistance 97 and the current limiting resistance 68 to the control member 70. A filament circuit 99 common to both electron discharge devices 43 and 44 is connected for energization by a third secondary winding 100 carried by the transformer 82.

The circuits for both sets of electron discharge devices 45 and 46 are the same, and like reference characters are applied to the various elements thereof in accordance with the following description of the circuit for the electro-responsive brake control valve device 17. Alternating current is supplied to the circuit controlled by the electron discharge devices 45 and 46 through the medium of a transformer 105 having a primary winding 106 connected by conductors 107 and 108 to the output terminals of the inverter 50. One secondary winding 110 of the transformer is provided with a connection at the right-hand end, as viewed in the drawing, to a conductor 111 leading to respective cathodes 112 of the electron discharge devices 45 and 46, and also connected through two parallel resistances 113 to the right-hand ends of the two corresponding resistors 33. The opposite end of the secondary winding 110 is connected in series with a resistance 115 and the magnet winding of the valve device 17 to a conductor 116 leading to the respective anodes 118 of the electron discharge devices 45 and 46. A filtering condenser 119 is preferably connected across the magnet winding of the control valve device for maintaining a substantially constant flow of current therethrough when the circuit is energized, as hereinafter explained.

Each of the electron discharge devices 45 and 46 is provided with a control member 120, which is adapted to be subjected to a negative biasing voltage normally rendering the device non-conductive. For this purpose a secondary winding 125 is carried by the transformer 105 and a connection provided between the left-hand end of the winding and the conductor 111 leading to the cathodes 112, the opposite end of the winding being connected through a resistor 128 and a current limiting resistor 129 to the control member 120 of each of the electron devices 45 and 46. For rendering each electron discharge device controllable in accordance with the voltage drop across the associated wheel-slip detecting resistor 33, a conductor 130 is provided for connecting the left-hand end of each resistor 33 to juncture of the resistors 129 and 128 for the corresponding control element 120.

Each pair of electron discharge valve devices 45 and 46 may be provided with a suitable filament circuit 135 that may be energized through the medium of a separate secondary winding 136 carried by the transformer 105.

In operation, when it is desired to effect an application of the brakes, the self-lapping brake valve device 12 is operated to supply fluid at the desired pressure to the straight air pipe 11, from which fluid under pressure flows to the brake cylinders 15 and 19 by way of the normally de-energized control valve devices 17 and 21, respectively. Upon the increase in pressure of fluid in the straight air pipe 11, the pneumatic switch 52 is closed for rendering the inverter device 50 operative to supply alternating current to the primary winding 83 of transformer 82, and also to the primary winding 106 of the respective transformers 105.

Referring first to the directional control circuits of the equipment shown in the drawing, the secondary winding 100 of transformer 82 then serves to energize the filament circuit 99 of electron discharge devices 43 and 44, while a pulsating negative biasing potential is normally impressed on each of control members 73 and 70 during one-half of each cycle of alternating current voltage delivered by the secondary winding 95. This will be apparent if it is assumed that the current induced in the secondary winding 95 during the first half of a cycle flows in a direction rendering the left-hand end of the winding positive and the right-hand end negative, thus making the control member 73 negative with respect to the cathode 76, and also making the control member 70 negative with respect to cathode 78. At the same instant the left-hand end of the secondary winding 85 is made positive, along with the connected anodes 75 and 77, while the right-hand end of the winding 85 connected to the cathodes 76 and 78 become negative, so that the electron discharge devices are both conditioned to conduct current only in the event of loss or sufficient reduction of the negative bias on the control member of either device. When the direction of flow of current through the transformer winding is reversed during the subsequent half cycle, the voltage at the anodes 75 and 77 becomes negative, so that neither electron discharge device can conduct current regardless of the voltage on the respective control members.

The two pairs of electron discharge devices 45 and 46 are likewise conditioned for operation when alternating current is rendered available through the medium of the transformers 105 in response to application of the brakes as just explained. Current induced in the secondary winding 136 of each transformer energizes the corresponding filament circuit of each set of electron discharge devices. It will be understood that the secondary winding 110 is so connected in the plate circuit of each set of electron discharge devices 45 and 46 as to cause the respective anodes 118 to become positive at the same instant a negative voltage is impressed on the respective control members 120 through the medium of the circuit supplied by the secondary winding 125, so that the devices are normally rendered nonconductive.

Let it be assumed that the vehicle is moving in such a direction as to cause each of the generators 30 to establish a voltage that is positive at the terminal 60 and negative at the terminal 61. Inasmuch as the control member 73 of the electron discharge device 43 is connected to the terminal 61 of the generator driven by the wheel 25, it will be apparent that the negative bias voltage on the control member is augmented, so that the electron discharge device is maintained nonconductive. A positive voltage is impressed on the control member 70 of the other electron discharge device 44, however, through the medium of the positively charged terminal 60, resistor 67, and current limiting resistor 68. Even when the vehicle is traveling at a very low speed, this positive voltage will sufficiently reduce the normal negative biasing potential on the control member 70, so that the electron discharge device 44 is rendered conductive, whereupon the coil of the selector relay device 35 becomes energized by current induced in the secondary winding 85 of the transformer and flowing from the left-hand side thereof by way of the relay coil, anode 77 and cathode 78 to the right-hand side of the secondary winding 85.

With the relay 35 thus energized, the four movable contact members 36 thereof are picked up, thus conditioning the entire control system for proper response with relation to the direction in which the vehicle wheel units are turning the generators 30.

It will thus be seen that each of the direct current generators is operated to supply current for charging the associated condenser 32 by way of a circuit which includes, in each case, terminal 60, conductor 63, contact member 40b, contact member 40 of the still deenergized relay 39, a conductor 150 leading to the right-hand end of resistor 33, the resistor 33, condenser 32, contact member 36 of the energized relay 35, contact element 36a, and conductor 62 leading to the generator terminal 61. It will be evident that with the generator current thus directed through the resistor 33 in a direction rendering the left-hand end thereof negative, the negative biasing potential on the grid or control member 120 of the associated electron discharge devices 45 and 46 is augmented, so that all of those devices are maintained nonconductive during the time that the condensers 32 are being charged.

When the speed of the vehicle begins to decrease, however, as a result of the application of the brakes just described, each condenser 32 that has been charged to approximately the voltage delivered by each axle generator 33 begins to discharge current through the associated resistor 33 and the other elements of the generator circuit previously described, as a result of the declining output of the generator. The current thus discharged by each of the condensers 32 flows through the resistor 33 in a direction rendering the left-hand end thereof positive and the right-hand end negative, as viewed in the drawing, so that a positive voltage is thus created to oppose the normal negative potential impressed upon the control member 120 of the connected electron discharge device.

It will be understood that the degree of current discharged by the condenser 32 in each of the circuits controlled by one of the axle-driven generators 30 is substantially proportional to the rate of decrease in the voltage delivered by the corresponding generator, and consequently is a measure of the rate of deceleration of the associated wheel unit. In actual practice, the elements of the grid biasing circuit for each of the electron discharge devices 45 and 46 are so proportioned and arranged with relation to the condenser discharge circuit controlled by the corresponding axle-driven generator as to cause the electron discharge device to remain nonconductive even when current is being discharged by the condenser 32 during deceleration as just explaind, so long as such discharge current does not exceed a value indicating a predetermined critical rate of deceleration of the associated vehicle wheel. This critical rate of deceleration of the wheel, which when exceeded would result in the creation of a positive potential at the left-hand end of resistor 33 and therefore on the control member 120 sufficient to so reduce the negative bias on the control member as to render the electron discharge device conductive, is preferably in the neighborhood of ten miles per hour per second, a rate of deceleration which has been found to occur only when a wheel is in a slipping condition.

If any of the wheel units of the vehicle should begin to slip along the rail, the electronic brake control means disclosed in the drawing in association with that wheel unit at once becomes operative to cause quick release of the braking force applied to that wheel unit in time to prevent the wheel unit from becoming locked and sliding. If, for example, the wheel unit 26 decelerates at a rate exceeding the aforementioned ten miles per hour per second, due to an excessive application of braking force through the medium of the brake cylinders 15, the resultant discharge of current from the associated condenser 32 through the resistor 33 connected thereto causes a positive voltage to be impressed on the control member 120 of the electron discharge device 45, which voltage sufficiently reduces the negative biasing potential normally impressed on the control member as to cause the device 45 to become conductive. The electron discharge device 45, when rendered conductive, effects energization of the magnet of the electroresponsive control valve device 17 through a circuit which includes the secondary winding 110 of the transformer 105, the resistor 115, the coil of the magnet valve device 17, conductor 116, anode 118 of the control valve device 45, and the associated cathode 112 which is connected to the same secondary winding.

Upon energization of the electromagnet of the control valve device 17, the usual valve element therein, not shown in the drawing, is actuated for cutting off further supply of fluid under pressure from the straight air pipe 11 to the brake cylinders 15, while venting the brake cylinders to the atmosphere. A quick release of the brakes acting on the wheel 26 is thus effected in time to prevent further deceleration thereof into a locked state. It will be understood that although the electron discharge device 45 thus effects flow of a pulsating direct current through the circuit including the magnet winding of the control valve device, the condenser 119 serves to insure satisfactory operation of the valve device to produce the desired result as just described.

When the brakes associated with the slipping wheel unit 26 are thus released, that unit rapidly picks up speed until it is once again rotating at the speed of the vehicle. If the fluid pressure brakes with which the vehicle is equipped are designed for sufficiently rapid response to the reduction in brake cylinder pressure in releasing the applied braking force, the wheel unit 26 may cease decelerating and begin to pick up speed before the brake cylinder pressure has been entirely exhausted. By reason of the extreme sensitivity and precision of control by the electronic brake control system embodying my invention, the fluid pressure brakes will in any event be released only for a time sufficient to insure that the wheel unit at fault will be restored to vehicle speed.

This automatically limited operation of the control valve device 17 to vent fluid under pressure from the brake cylinders only to the extent required for correction of the wheel slipping condition is one of the advantages arising from use of the electron discharge device for controlling energization of the magnet portion of the brake control valve device, it being understood that when the slipping wheel unit has ceased to decelerate at an abnormally rapid rate, the consequent fading of the discharge current from the condenser 32 permits restoration of the normal negative bias on the control member of the electron discharge device affected. The electron discharge device then again becomes non-conductive for rendering the control valve device inoperative to cause further reduction in brake cylinder pressure. Since electrical energy is provided in the form of alternating current, the grid or control member of each electron discharge device always regains control of the anode-cathode circuit at the first half cycle after the grid becomes negatively biased below the cut-off point.

When the slipping wheel unit accelerates back toward a speed corresponding to vehicle speed, the corresponding condenser 32 is again charged by current delivered from the associated axle-driven generator 30. A negative potential is thus impressed on the control member 120 of the electron discharge device 45 substantially proportional to the rate of acceleration of the slipping wheel unit, by reason of the voltage drop produced across the associated resistor 33. Such negative potential exists only during acceleration of the wheel units and by augmenting the normal negative bias on the control member 120 of the discharge device serves inherently to maintain the discharge device non-conductive during the time that the slipping wheel unit accelerates back toward vehicle speed.

As a practical matter, the rate of resupply of fluid under pressure to the brake cylinders 15 effected when the control device 17 is restored to its normal condition in response to the discharge device 45 being rendered non-conductive is preferably restricted in order to prevent a too rapid build-up of the pressure in the brake cylinders at a time when the wheel unit is still slipping, for the reason that a too rapid build up of the pressure in the brake cylinders at such time may tend to create sufficient braking effect on the wheel unit to cause it to decelerate to zero speed, that is lock and slide. A control valve, such as shown in the copending application, Serial No. 467,236 of Joseph C. McCune and George K. Newell, previously mentioned, functioning as it does to restrict the rate of resupply to the brake cylinder, may therefore be advantageously employed. For the purposes of the invention claimed in this application, the particular character of the control valve in this respect is not material and, accordingly, it has been deemed unnecessary to show and describe in detail a control valve operative to resupply fluid under pressure to the brake cylinder at a restricted rate.

Should the wheel unit 26 again begin to slip, or should any other wheel unit begin to slip after the brakes are reapplied as just described, the above operation is repeated automatically so that at no time are any of the wheel units permitted to become locked and slide.

When the vehicle comes to a stop, the control valve devices 17 and 21, will of course, all be restored to their normal deenergized condition, assuming that they have been previously operated or energized to effect reduction in the pressure of the fluid in the associated brake cylinder, and consequently the brakes will remain applied on the wheel units until they are subsequently released by operation of the brake valve 12 prior to again starting the vehicle.

From the description just presented of a typical operation of the electronic brake control system shown in the drawing, it will be evident that if the vehicle is operated in a reverse direction, rather than in the direction assumed by way of example, the electron discharge device 44 will remain nonconductive while the electron discharge device 43 will be rendered conductive, thereby causing energization of the directional relay 39 instead of relay 35. The circuit then established for controlling the grids of the electron discharge devices 45 and 46 will produce the same result as has already been explained.

Following completion of an application of the brakes in any case, the brake valve device 12 may be moved to its release position for effecting the usual release of the brakes. The resultant reduction in the pressure of fluid in control pipe 11 will then effect operation of the pneumatic switch device 52 to cut off the supply of electrical energy to the brake control system.

In the foregoing description of a practical application of my invention involving the control of brakes on a railway vehicle, there has thus been disclosed an electropneumatic brake system of elementary form in which are combined fluid pressure brake means operable in response to manipulation of a brake valve for controlling application and release of the brakes associated with wheel units of the vehicle, electrical means including axle driven direct current generators for measuring the rate of deceleration of the wheel unit produced during an application of the brakes, and electronic brake controlling means energized by alternating current, and cooperative with the electrical means and with the fluid pressure brake means, for affording precise and smooth automatic control of the brakes in a manner preventing sliding of any wheel. It is contemplated that within the scope of the present invention, the electronic brake controlling apparatus disclosed may be adapted for adjustment to various special operating conditions which may be encountered in railway service, and may be readily designed for association with other types of brake equipments than the class described.

Having now described my invention, what I claim as new and desire to secure by Letters Patent is:

1. In a control system for equipment including a rotary member and electroresponsive control means operative to govern operation of said rotary member, in combination, electrical means operative to establish an electrical characteristic that is a measure of a rotative condition of said rotary member, an electron discharge device having a control element and an anode-cathode circuit arranged to control energization of said electroresponsive control means, alternating current means including a transformer for impressing a biasing voltage on said control element for normally rendering said electron discharge device nonconductive, said transformer being constructed and arranged for also energizing said anode-cathode circuit when said device becomes conductive, and means responsive to the electrical characteristic created by said electrical means for subjecting said control element to a corresponding voltage in opposition to said biasing voltage, whereby said electroresponsive control means is so controlled as to correspondingly govern operation of said rotary member.

2. In a control system for a vehicle having a wheel, in combination, electroresponsive control means for controlling said wheel, electrical means constructed and arranged to establish an electrical characteristic that is an indication of a slipping condition developed by said wheel, electron discharge means constructed and arranged to respond to said electrical characteristic for governing energization of said electroresponsive control means, a source of alternating current, and transformer means interposed between said source and said electron discharge means, said transformer means being constructed and arranged to subject said electron discharge means to a biasing potential normally rendering said means nonconductive, and also to supply current for energizing said electroresponsive control means under the control of said electron discharge means.

3. In a brake system for a vehicle having a wheel, in combination, electroresponsive brake controlling means operative to reduce the degree of an application of the brakes for correcting a slipping condition of said wheel, electrical wheel-slip detector means operative to measure the rate of rotational deceleration of said wheel including an element on which is impressed a potential substantially proportional to the rate of deceleration of the wheel, an electron discharge device having an anode-cathode circuit connected to said brake controlling means and a control member subject to the potential established by said wheel-slip detector means, and transformer means connected to energize the anode-cathode circuit and also to impress a biasing voltage on said control member for normally rendering said electron discharge device nonconductive.

4. In a brake system for a vehicle having a wheel, in combination, electroresponsive brake controlling means operative to reduce the degree of an application of the brakes for correcting a slipping condition of said wheel, electrical wheel-slip detector means operative to measure the rate of rotational deceleration of said wheel including an element on which is impressed a potential substantially proportional to the rate of deceleration, an electron discharge device having an anode-cathode circuit connected to said brake controlling means and a control member subject to a positive voltage established by said wheel-slip detector means in response to slipping of said wheel, and a transformer having one secondary winding connected to energize said anode-cathode circuit and another secondary winding connected to impress a biasing voltage on said control member for rendering said electron discharge device nonconductive so long as the positive potential established by said wheel-slip detector means does not exceed a predetermined value.

5. In a brake control system for a vehicle having a wheel, in combination, electroresponsive brake controlling means operative to reduce the degree of an application of the brakes for correcting a slipping condition of said wheel, a generator driven by said wheel, a condenser adapted to be charged by said generator during acceleration of the wheel and to be discharged upon deceleration thereof, a source of alternating current including a transformer, and electron discharge means connected thereto and arranged to respond to a predetermined value of current discharged by said condenser, indicating a wheel slipping condition, for effecting energization of said electroresponsive brake controlling means from said source.

6. In a fluid pressure brake control system for a vehicle having a wheel, in combination, electroresponsive brake control means operable to reduce the degree of an application of the brakes for correcting a slipping condition of said wheel, means for controlling the energization of said brake control means and comprising a source of alternating current and an electron discharge device having an anode, a cathode, and a control member, means for impressing a voltage from said source on said control member normally rendering said discharge device nonconductive, electrical means including a condenser constructed and arranged to be charged to a potential varying according to the operation of said vehicle wheel, and a discharge circuit including a resistor connected to said control member and adapted to receive the current discharged from said condenser at a rate measuring the deceleration of the wheel, the discharge current from said condenser being always directed through said resistor in such a direction as to impress a resultant voltage on said control member whereby said electron discharge device is rendered conductive in response to deceleration of the wheel at a rate exceeding a predetermined rate.

7. In a fluid pressure brake control system for a vehicle having a wheel, in combination, electroresponsive brake control means operable to reduce the degree of an application of the brakes for correcting a slipping condition of said wheel, means for controlling the energization of said brake control means and comprising a source of alternating current and an electron discharge device having an anode, a cathode, and a control member, means for impressing a voltage from said source on said control member normally rendering said discharge device nonconductive, a control circuit including a condenser and a resistor connected to said control member, and means for energizing said circuit in accordance with the rotative condition of said wheel, whereby upon deceleration of said wheel at a rate exceeding a predetermined rate the resultant voltage impressed on said control member will render said electron discharge device conductive.

8. In a fluid pressure brake control system for a vehicle having a wheel, in combination, electroresponsive brake control means operable to reduce the degree of an application of the brakes for correcting a slipping condition of said wheel, means for controlling the energization of said brake control means and comprising a source of alternating current and an electron discharge device having an anode, a cathode, and a control member, means for impressing a voltage from said source on said control member normally rendering said discharge device nonconductive, a control circuit including a condenser and a resistor connected to said control member, a generator driven by said wheel for energizing said control circuit proportionately to the speed thereof, and directional control means in said circuit operable to insure flow of the discharge current from said condenser to said circuit in a direction such as to impress a resultant voltage on said control member rendering said electron discharge device conductive in response to deceleration of the wheel at a rate exceeding a predetermined rate.

9. In a brake system for a vehicle having a plurality of wheel units and fluid pressure brake means for each of said wheel units, the combination therewith of an electroresponsive brake control device operative to reduce the degree of application of the brakes on said wheel units, a source of alternating current including a transformer, a plurality of electron discharge devices associated with the respective wheel units and coupled to said transformer, said discharge devices having parallel related anode-cathode circuits connected to said brake control device and respective control members normally biased negatively for rendering said discharge devices nonconductive, electrical means associated with each of said wheel units and individually operative to establish a voltage proportional to the rate of deceleration of the corresponding wheel unit, and means relating each of said electrical means to the corresponding electron discharge device in a manner such as to establish a resultant voltage on the control member thereof tending to render that discharge device conductive in case the wheel unit affected decelerates at a slipping rate.

10. In a brake control equipment for a vehicle having a wheel unit, the combination with electroresponsive brake control means operative to effect release of the brakes on said wheel unit, of an electron discharge device having anode-cathode circuit arranged to control energization of said electroresponsive brake control means and a control member subject to a biasing negative voltage normally rendering said discharge device nonconductive, a direct current generator driven by said wheel unit, a control circuit including a condenser arranged to be charged by said generator and a resistance connected to said control member, said condenser at times being adapted to discharge current through said resistance to produce a potential measuring the rate of deceleration of said wheel unit, and electronic direction responsive means for conditioning said control circuit to insure impression on said control member of a resultant positive voltage rendering said discharge device conductive in the event of deceleration of said wheel unit at a rate indicating a slipping condition.

11. In a brake control equipment for a vehicle having a wheel unit, the combination with electroresponsive brake control means operative to effect release of the brakes on said wheel unit, of an electron discharge device having an anode-cathode circuit arranged to control energization of said electroresponsive brake control means and a control member subject to a biasing negative voltage normally rendering said discharge device nonconductive, a direct current generator driven by said wheel unit, a control circuit including a condenser arranged to be charged by said generator and a resistance connected to said control member, said condenser at times being adapted to discharge current through said resistance to produce a potential measuring the rate of deceleration of said wheel unit, directional relay means for insuring flow of condenser discharge current through said resistance always in a direction for impressing a positive potential on said control member during deceleration of said wheel unit, and electronic means controlled by said generator for selectively operating said directional relay means.

12. In a brake control equipment for a vehicle having a wheel unit, the combination with electroresponsive brake control means operative to effect a release of the brakes on said wheel unit, of an electron discharge device having an anode-cathode circuit arranged to control energization of said electroresponsive brake control means and a control member subject to a biasing negative voltage normally rendering said discharge device nonconductive, a direct current generator driven by said wheel unit, a control circuit including a condenser arranged to be charged by said generator and a resistance connected to said control member, said condenser at times being adapted to discharge current through said resistance to produce a potential measuring the rate of deceleration of said wheel unit, directional relay means for insuring flow of condenser discharge current through said resistance always in a direction for impressing a positive potential on said control member during deceleration of said wheel unit, and a pair of electron discharge devices controlling energization of said directional relay means according to the direction of operation of said generator.

13. In a brake control equipment for a vehicle having a wheel unit, the combination with electroresponsive brake control means operative to effect release of the brakes on said wheel unit, of an electron discharge device having an anode-cathode circuit arranged to control energization of said electroresponsive brake control means and a control member subject to a biasing negative voltage normally rendering said discharge device nonconductive, a direct current generator driven by said wheel unit for supplying voltage of opposite polarity for opposite directions of rotation of the wheel unit, a control circuit including a condenser arranged to be charged by said generator and a resistance connected to said control member, said condenser at times being adapted to discharge current through said resistance to produce a potential measuring the rate of deceleration of said wheel unit, directional relay means for causing flow of condenser discharge current through said resistance always in a direction for impressing a positive potential on said control member during deceleration of said wheel unit, a source of alternating current voltage, and electron discharge means governed by the polarity of the voltage supplied by said generator for selectively controlling energization of said relay means, by current supplied from said source, in accordance with the direction of rotation of the wheel unit.

14. In a fluid pressure brake control system for a vehicle having a wheel on which the brakes may be applied and released under the control of the operator, in combination, electroresponsive brake control means effective when energized to cause a reduction in the degree of application of the brakes active on the wheel, an electron discharge device having a control member, a source of alternating-current voltage, means for impressing a biasing voltage from said source on said control member to render said discharge device normally non-conductive, and means responsive to the occurence of a slipping condition of the wheel for impressing a voltage on said control member in opposition to the normal biasing voltage impressed thereon so as to render said electron discharge device conductive, said discharge device being effective, when conductive, to cause energization of said electroresponsive brake control means from said source.

15. In a fluid pressure brake control system for a vehicle having a wheel on which the brakes may be applied and released under the control of the operator, in combination, electroresponsive brake control means operative, when energized, to cause a reduction in the degree of application of the brakes active on the wheel, an electron discharge device having a control member, a source of alternating-current voltage, means for impressing a biasing voltage from said source on said control member so as to render said discharge device normally non-conductive, means responsive to a predetermined rotative condition of the wheel for impressing a voltage on said control member in opposition to the normal biasing voltage thereon for rendering said discharge device conductive, said discharge device being effective, when conductive, to effect energization of said electroresponsive brake control means from said source.

16. In a fluid pressure brake control system for a vehicle having a wheel on which the brakes may be applied and released under the control of the operator, in combination, electroresponsive brake control means operative to control the degree of application of the brakes active on the wheel, an electron discharge device having a control member, a source of alternating-current voltage, means connected to said source for impressing a normal biasing voltage on the said control member so as to render the said discharge device normally non-conductive, additional biasing means connected to said control member, and means responsive to a predetermined rotative condition of the wheel for causing said additional biasing means to impress a voltage on said control member in opposition to the normal biasing voltage impressed thereon so as to cause said discharge device to become conductive, said discharge device being effective, when conductive, to cause energization of the electroresponsive brake control means from said source.

17. In a brake control equipment for a vehicle having a wheel unit on which the brakes may be applied and released under the control of the operator, in combination, an electron discharge device having a control element normally subject to a biasing potential rendering the discharge device non-conductive, a biasing resistor connected to said control element, a condenser, a direct-current generator means for supplying a direct current voltage of opposite polarity for opposite directions of rotation of the wheel unit and in substantial proportion to the rotational speed of the wheel unit, means effective upon initiation of an application of the brakes under the control of the operator for causing charging of said condenser by voltage supplied from said direct-current generator means, means providing a circuit including said biasing resistor and said condenser whereby said condenser discharges current through said biasing resistor substantially in accordance with the rate of reduction of voltage supplied by the generator means and consequently in accordance with the rate of deceleration of the wheel unit, means controlled automatically according to the polarity of the voltage supplied by the said generator means for causing the current discharged by said condenser through said biasing resistor to flow always in the same direction through the resistor upon deceleration of the wheel unit so as to create a biasing potential on the control element of the discharge device in opposition to the normal biasing potential impressed thereon, said discharge device being rendered conductive whenever the potential impressed on said control element by said biasing resistor exceeds a certain value corresponding to a certain rate of deceleration of the wheel unit, and electroresponsive brake control means controlled by said discharge device and operative so long as said discharge device is conductive to cause a reduction in the degree of application of the brakes active on the wheel unit.

CLAUDE M. HINES.